United States Patent
Matsubara

(10) Patent No.: US 7,808,141 B2
(45) Date of Patent: Oct. 5, 2010

(54) STEPPING MOTOR AND ROTOR

(75) Inventor: Masaaki Matsubara, Yonago (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 315 days.

(21) Appl. No.: 12/076,222

(22) Filed: Mar. 14, 2008

(65) Prior Publication Data

US 2008/0238265 A1    Oct. 2, 2008

(30) Foreign Application Priority Data

Mar. 30, 2007   (JP) .............................. 2007-093772

(51) Int. Cl.
*H02K 1/14*    (2006.01)
*H02K 1/17*    (2006.01)

(52) U.S. Cl. ..................... 310/156.12; 310/156.15; 310/156.48; 310/156.49

(58) Field of Classification Search ............ 310/49 R, 310/81, 156.12, 156.15, 156.48–156.49
See application file for complete search history.

(56) References Cited

U.S. PATENT DOCUMENTS

| 4,803,389 | A | 2/1989 | Ogawa et al. | |
| 6,365,995 | B1 * | 4/2002 | Fukuda et al. | 310/81 |
| 7,560,836 | B2 * | 7/2009 | Yasuda | 310/268 |
| 7,626,291 | B2 * | 12/2009 | Yasuda | 310/156.39 |
| 2006/0049705 | A1 | 3/2006 | Matsubara et al. | |
| 2006/0267427 | A1 | 11/2006 | Matsubara et al. | |
| 2007/0182264 | A1 * | 8/2007 | Jun et al. | 310/156.38 |

FOREIGN PATENT DOCUMENTS

| JP | 54-044708 | 4/1979 |
| JP | 60-043059 | 3/1985 |
| JP | 63-31494 | 2/1988 |
| JP | 04-244774 | 9/1992 |
| JP | 06-078513 | 3/1994 |
| JP | 09-308214 | 11/1997 |
| JP | 2001-057752 | 2/2001 |
| JP | 2002-234449 | 8/2002 |
| JP | 2003-134771 | 5/2003 |
| JP | 2006-74949 | 3/2006 |
| JP | 2006-333668 | 12/2006 |

OTHER PUBLICATIONS

Japanese Office Action mailed Jan. 6, 2009 for Japanese Application No. 2007-093772 with translation.

* cited by examiner

*Primary Examiner*—Tran N Nguyen
(74) *Attorney, Agent, or Firm*—Wenderoth, Lind & Ponack, L.L.P.

(57) ABSTRACT

A stepping motor has a stator and a rotor disposed to surround the stator. The rotor has an annular magnet which has a plurality of magnetic poles formed along a circumference thereof, and a comb-teeth-shaped back yoke which is disposed to surround the magnet and has a plurality of comb teeth, the comb teeth facing boundary positions of adjacent magnetic poles.

18 Claims, 7 Drawing Sheets

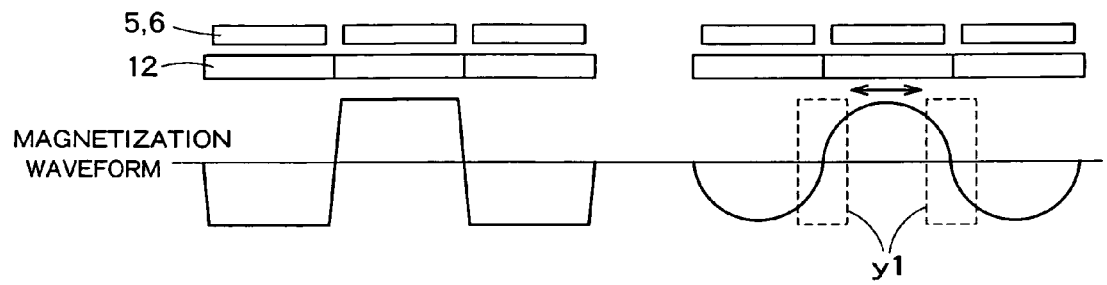
F I G. 4A                F I G. 4B
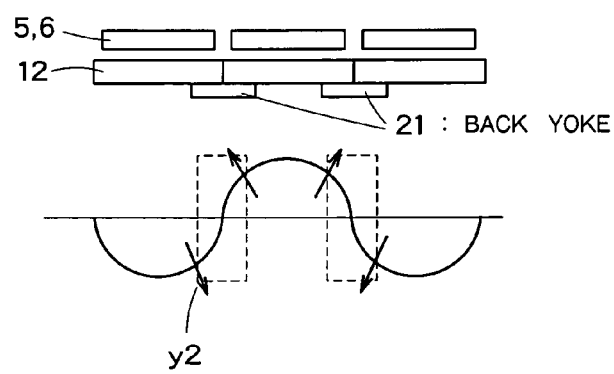
F I G. 5

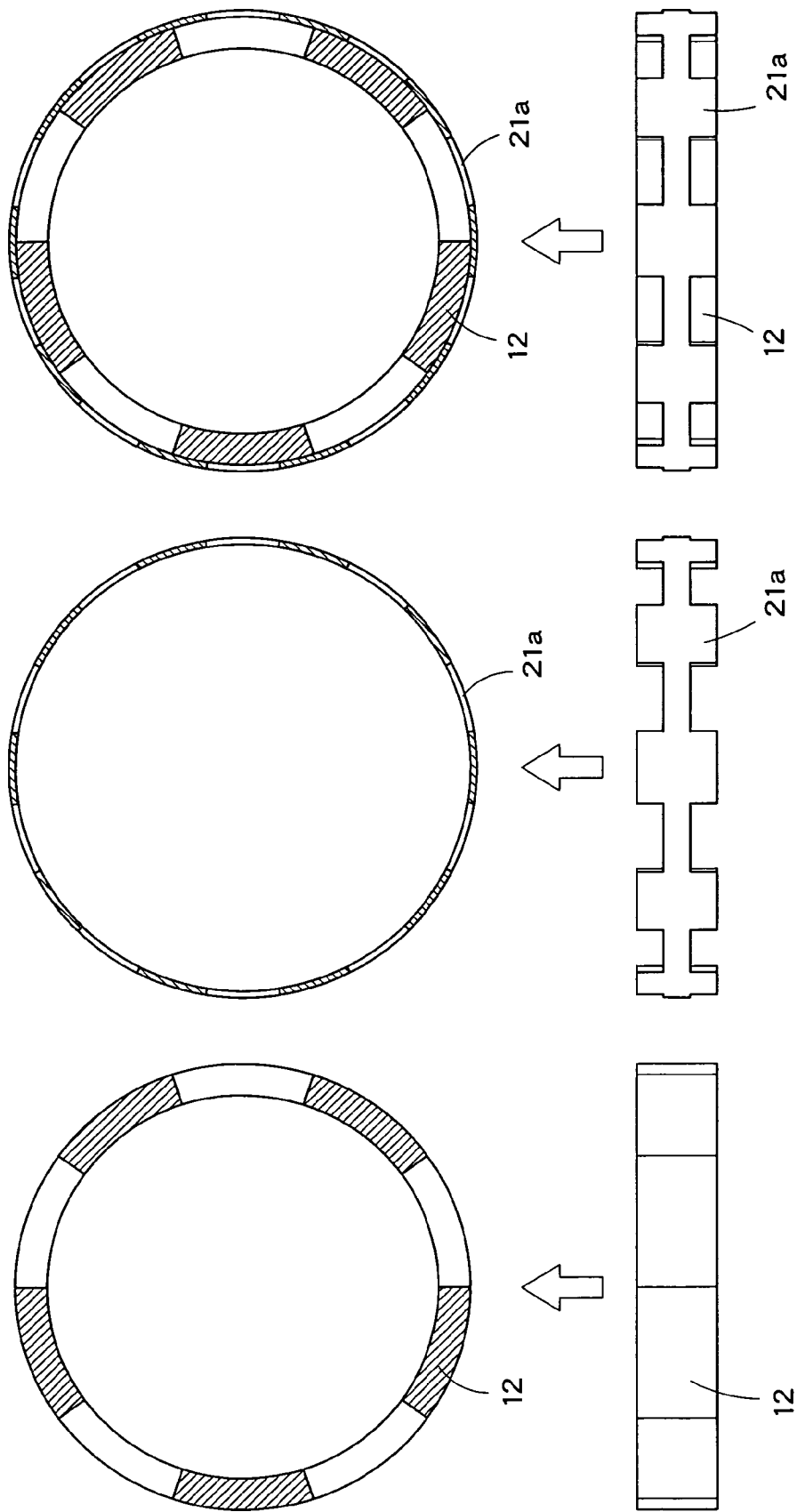

STEPPING MOTOR AND ROTOR

BACKGROUND OF THE INVENTION

1. Field of the Invention

The present invention relates to a stepping motor having a rotor disposed to surround a stator and a rotor for the stepping motor.

2. Related Art

A stepping motor has a simple structure and is easy to control and is therefore used in various fields. Especially, a PM (Permanent Magnet) stepping motor using a permanent magnet can be manufactured at low cost and is therefore used frequently in various fields.

Reliability is important in this type of stepping motor and it is especially required of the stepping motor to start up normally under all conditions. To ensure that the stepping motor starts up normally, it is necessary to control the stepping motor to stop at an exact predetermined position. For high-precision stop position control, adjusting detent torque to be small is common practice. This is because the detent torque is a load in rotation.

However, if the load is heavy, e.g., if a weight is used as a load as in a stepping motor for generating vibrations, it is difficult to precisely stop the motor at a desired stop position when the motor is not energized. Therefore, there have been proposed techniques for reliably stopping the load by increasing detent torque when the motor is not energized (see Japanese Patent Application Laid-open No. 43059/1985, No. 78513/1994 and No. 308214/1997).

Among the PM stepping motors, an outer-rotor type single-phase stepping motor has a rotor disposed to surround an annular stator. The stator has stator yokes formed with a plurality of pole teeth and the rotor has a magnet in which magnetic poles having different polarities are disposed alternately along a circumference thereof.

It is known that detent torque (cogging torque) changes by adjusting a magnetization waveform of a magnet, i.e. a surface magnetic flux density distribution waveform of the magnet. As the magnetization waveform is close to a sinusoidal wave, harmonic components decrease, thereby reducing a detent torque. Therefore, it is a common practice to adjust the magnetization waveform to be close to the sinusoidal wave.

For example, in Japanese Patent Application Laid-open No. 2001-57752, a back yoke is disposed to surround a magnet and is provided with recessed portions along boundary positions between magnetic poles of the magnet. The boundary positions between the magnetic poles of the magnet face the recessed portions. Therefore, flux content changes slowly at the boundary positions of the magnetic poles and the detent torque can be reduced.

In fact, in a structure for reducing the detent torque, it is possible to precisely perform stop position control. However, there is no guarantee that the stop position control can be precisely carried out when the motor is not energized. A shaft of a rotor may rotate even when the motor is not energized. In such a case, it is preferable to carry out the stop position control for stopping the rotor in a predetermined position. The reason is that if the rotor stops in an arbitrary rotating position when the motor is not energized, start-up performance is deteriorated when energization is started up after that. However, the above-described Patent Documents 1 to 4 do not particularly consider the stop position control at non-energization time of the motor.

SUMMARY OF THE INVENTION

The present invention has been made in light of the above problem and it is an object of the invention to provide a stepping motor in which stop position control at non-energization time can be carried out with high accuracy by adjusting a magnetization waveform of a magnet and which has improved start-up performance.

According to one aspect of the present invention, a stepping motor comprises:
a stator; and
a rotor disposed to surround the stator, the rotor having:
an annular magnet which has a plurality of magnetic poles formed along a circumference thereof; and
a comb-teeth-shaped back yoke which is disposed to surround the magnet and has a plurality of comb teeth, the comb teeth facing boundary positions of adjacent magnetic poles.

According to one aspect of the present invention, a rotor for a stepping motor comprises:
an annular magnet which has a plurality of magnetic poles formed along a circumference thereof; and
a comb-teeth-shaped back yoke which is disposed to surround the magnet and has a plurality of comb teeth, the comb teeth facing boundary positions of adjacent magnetic poles.

BRIEF DESCRIPTION OF THE DRAWINGS

The above object and other advantages of the present invention will become more apparent by describing in detail the preferred embodiment of the present invention with reference to the attached drawings in which;

FIG. 4A is a drawing showing a magnetization waveform of a rectangular wave and FIG. 4B is a drawing showing a magnetization waveform of a sinusoidal wave;

FIG. 5 is a drawing showing positional relationships between magnetic poles of the magnet 12 and comb teeth;

FIGS. 10A to 10C are drawings showing an example in which an annular comb-teeth-shaped back yoke 21a is provided separately from a frame 13.

DETAILED DESCRIPTION OF THE INVENTION

An embodiment of the present invention will be described below with reference to the drawings.

Figure 1:
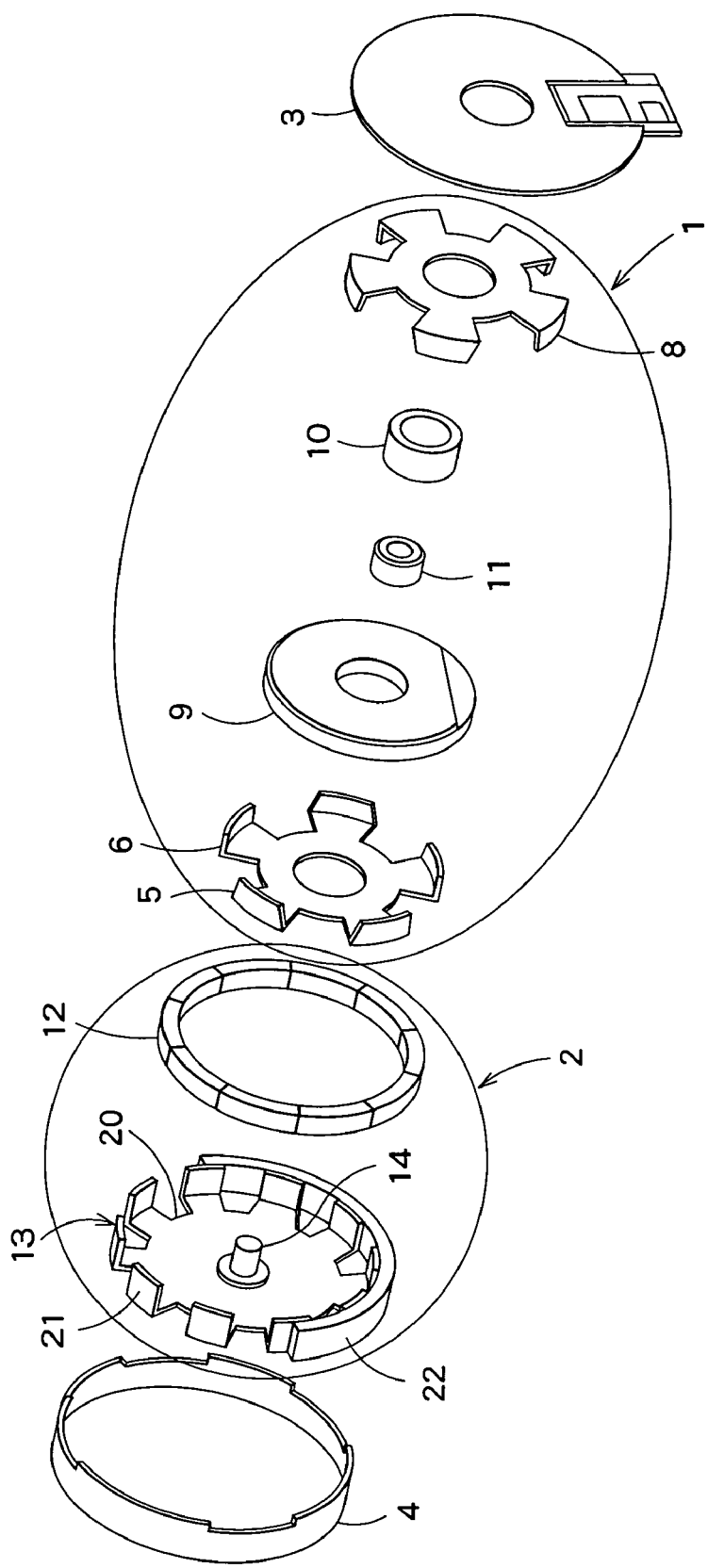
FIG. 1 is an exploded perspective view of a stepping motor according to an embodiment of the present invention.
Figure 2:
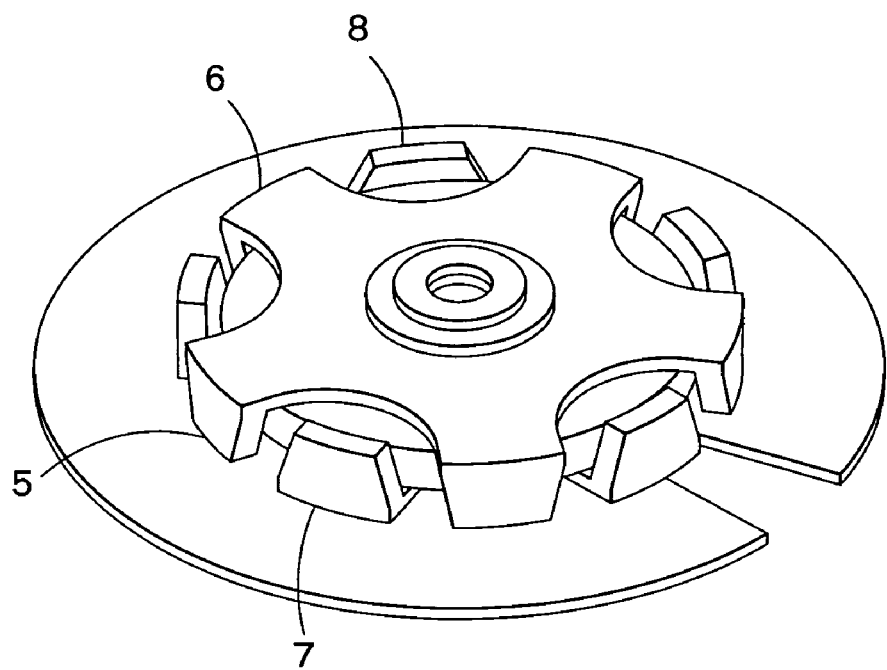
FIG. 2 is a perspective view of an assembled state of a stator portion of the stepping motor in FIG. 1.

FIG. 1 is an exploded perspective view of a stepping motor according to an embodiment of the invention. FIG. 2 is a perspective view at an assembled state of a stator portion of the stepping motor in FIG. 1.

The stepping motor according to the embodiment is of an outer rotor type and includes a stator 1, a rotor 2 surrounding the stator 1, a bracket (bottom plate) 3 for retaining the stator 1 and having a terminal for supplying power, and a cover 4 for protecting the rotor 2.

The stator 1 includes an annular first stator yoke 6 having a plurality of pole teeth 5 along its circumference thereof, an annular second stator yoke 8 disposed to face the first stator yoke 6 and having a plurality of pole teeth 7, a stator coil 9 disposed between the first and second stator yokes 6, 8, a core 10 fitted and inserted into a hole formed in a central portion of the stator coil 9, and a metal bearing 11 fitted and inserted into a hole formed in a central portion of the core 10.

The rotor 2 includes an annular magnet 12 disposed to surround the first and second stator yokes 6, 8, a frame 13 for retaining the magnet 12, and a shaft 14 mounted to a central portion of the frame 13. In the magnet 12, as many magnetic poles as the pole teeth of the stator yokes are formed alternately along a circumference thereof.

The frame 13 includes a flat plate 20 of which a central portion is attached to the shaft 14, a comb-teeth-shaped back yoke 21 having a plurality of comb teeth disposed at a constant interval along a circumference of the flat plate 20, and an eccentric weight 22 joined to a portion of an outer side face of the comb-teeth-shaped back yoke 21. The comb-teeth-shaped back yoke 21 is a characteristic portion of the embodiment and its structure will be described later in detail.

When the respective members forming the stator 1 are assembled, the stator of the stepping motor as shown in FIG. 2 is obtained. FIG. 2 shows a state in which the cover 4 is detached.

The first and second stator yokes 6, 8 are interdigitated. In other words, the plurality of pole teeth 7 of the second stator yoke 8 are disposed in gaps between the plurality of pole teeth 5 of the first stator yoke 6, and the plurality of pole teeth 5 of the first stator yoke 6 are disposed in gaps between the plurality of pole teeth 7 of the second stator yoke 8.

In the stepping motor in FIG. 1, if an electric current is fed through the stator coil 9, magnetic flux according to a direction of the electric current is generated and the pole teeth 5, 7 of the first and second stator yokes 6, 8 are magnetized. The pole teeth 5, 7 face the magnetic poles of the magnet 12 and the pole teeth 5, 7 and the magnetic poles attract each other in some places and repel each other in others. Thus, the magnet 12 turns by one magnetic pole (step). Then, if the direction of the electric current fed through the stator coil 9 is changed, the magnet 12 further turns by one step. In this way, by alternately changing the direction of the electric current fed through the stator coil 9, the magnet 12 turns by each step.

Figure 3:
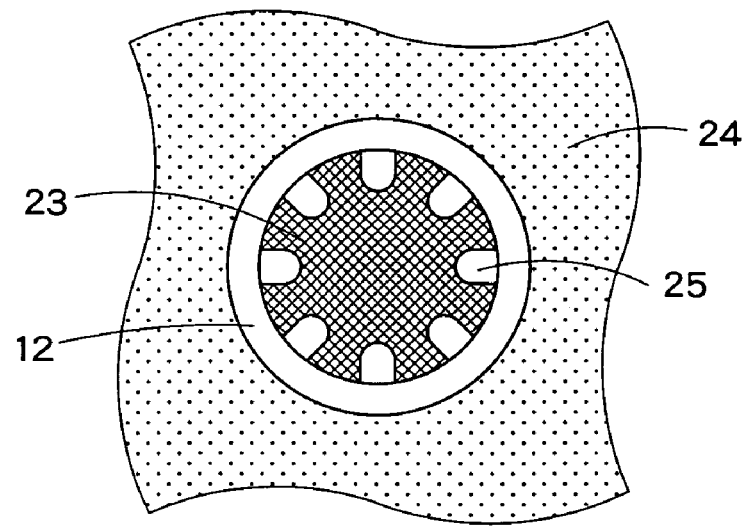
FIG. 3 is a drawing for explaining magnetization of the magnet.

The magnet 12 is magnetized with a magnetization waveform (waveform of surface magnetic flux density distribution of the magnet) before it is mounted as a part of the stepping motor in FIG. 1. Magnetization of the magnet 12 is carried out by disposing a magnetizing yoke 23 on an inner peripheral side of the magnet 12, disposing a magnetizing back yoke 24 on an outer peripheral side of the magnet 12, and feeding electric currents through coils of the magnetizing yoke 23, as shown in FIG. 3.

The magnetizing yoke 23 is formed with as many slits (grooves) 25 as the magnetic poles of the magnet 12. By disposing the coils in the slits 25 and feeding the electric currents in opposite directions through the alternate adjacent coils, the magnetic poles of the magnet 12 are magnetized.

By changing a shape of the magnetizing yoke 23, the magnetization waveform of the magnet 12 can be adjusted. The electric currents of several kA (amperes) or greater need be fed instantaneously through the coils in magnetization, wire diameters of the coils need be as large as possible, and the respective coils have to be reliably insulated. Furthermore, the smaller the magnet 12, the more difficult it becomes to secure spaces for the slits 25. For these reasons, it is not easy to adjust the shape of the magnetizing yoke 23 and, as a result, it is impossible to precisely adjust the magnetization waveform of the magnet 12 only with the magnetizing yoke 23.

It is a common practice to adjust the magnetization waveform of the magnet 12 to be close to the sinusoidal wave. This is because harmonic components disappear and the detent torque during energization can be reduced if the magnetization waveform becomes the sinusoidal wave. However, experiments conducted by the present inventor revealed that, the closer the magnetization waveform is to a rectangular wave, the more stably the stop position of the stepping motor can be controlled when the motor is not energized. The reason is that if the magnetization waveform comes close to the rectangular wave, the magnetic flux distribution at each magnetic pole of the magnet 12 becomes uniform and the magnetic flux distribution changes by a large amount in the boundary position between the magnetic poles.

FIGS. 4A and 4B are drawings showing examples of the magnetization waveform. FIG. 4A shows the magnetization waveform of the rectangular waveform and FIG. 4B shows the magnetization waveform of the sinusoidal wave. While the magnetic flux distribution of each magnetic pole of the magnet 12 is uniform in the case of FIG. 4A, the magnetic flux becomes smaller at end portions than at a central portion of each magnetic pole and the magnetic flux distribution is nonuniform in the magnetic pole in the case of FIG. 4B. Especially, as shown in a broken line y1 in FIG. 4B, a degree of nonuniformity of the magnetic flux increases near the boundary between the magnetic poles.

The comb-teeth-shaped back yoke 21 that is the characteristic portion of the embodiment will be described below in detail. The comb-teeth-shaped back yoke 21 has as many magnetic poles as the magnetic poles of the magnet 12. FIG. 5 is a drawing showing positional relationships between the magnetic poles of the magnet 12 and the comb teeth. FIG. 5 shows only part of magnetic poles and comb teeth. As shown in the drawing, each of the comb teeth of the comb-teeth-shaped back yoke 21 is disposed so that the central portion of each comb tooth faces the boundary position between the two adjacent magnetic poles of the magnet 12. Widths of the comb teeth are about half the width of the magnetic pole of the magnet 12.

The experiment conducted by the present inventor revealed that, by disposing the comb teeth and the magnetic poles in the positions in FIG. 5, amplitude of the magnetization waveform increases near the boundaries between the magnetic poles as shown by arrows y2 and that, as a result, the magnetization waveform comes close to the rectangular wave.

Figure 6:
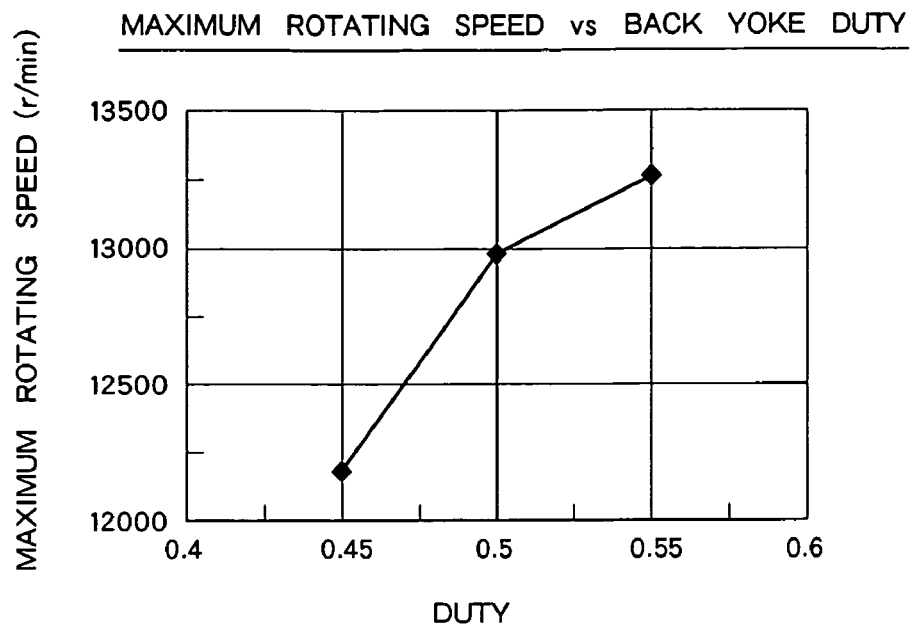
FIG. 6 is a graph showing a relationship between a width of the comb tooth of a comb-teeth-shaped back yoke 21 and the maximum rotating speed of the stepping motor.

FIG. 6 is a graph showing a relationship between the widths of the comb teeth of the comb-teeth-shaped back yoke 21 and the maximum rotating speed of the stepping motor. An abscissa in FIG. 6 represents duty indicating a ratio of the widths of the comb teeth to the width of the magnetic pole of the stepping motor and the maximum rotating speeds are plotted along an ordinate for duties of 45%, 50%, and 55%, respectively. As shown in the figure, the greater the width of the comb tooth, the more the maximum rotating speed increases. Because the motor of the higher maximum rotating speed is preferable, it is apparent that the wider comb tooth is preferable judging only from the result in FIG. 6.

Figure 7:
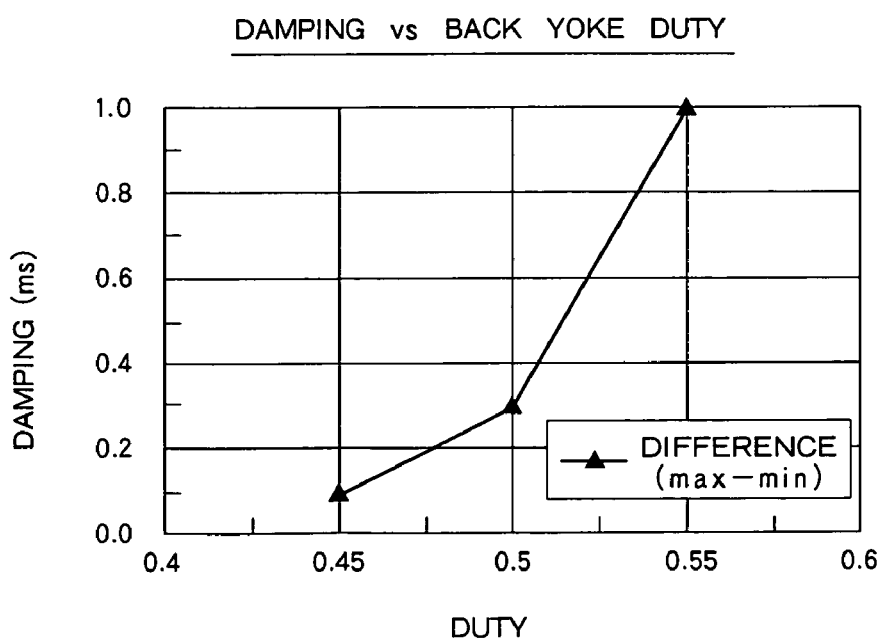
FIG. 7 is a graph showing a relationship between a width of the comb tooth of the comb-teeth-shaped back yoke 21 and damping.

FIG. 7 is a graph showing a relationship between the widths of the comb teeth of the comb-teeth-shaped back yoke 21 and damping. In FIG. 7, values of damping are plotted for the above-described duties of 45%, 50%, and 55%, respectively.

Here, damping refers to a time (rise time) required to pass through a stable position of the stepping motor for the first time when the electric current is fed in one direction from the state in which the motor is not energized. For example, in a case of carrying out an overshooting operation for passing through the stable position, damping refers to the time required by when the stable position is firstly passed through the first overshooting of the stable position.

The smaller the value of damping is, the more excellent the motor is in performance. The narrower widths of the comb teeth are, the more preferable the motor is, judging only from the result in FIG. 7.

As described above, FIGS. 6 and 7 show opposite results if attention is focused on the widths of the comb teeth. It is clear from these results that a duty of 50%, i.e., the widths of the comb teeth of the comb-teeth-shaped back yoke 21 that are about half the width of the magnetic pole of the magnet 12, is preferable to secure performance of both the maximum rotating speed and the damping of the stepping motor.

Figure 8:
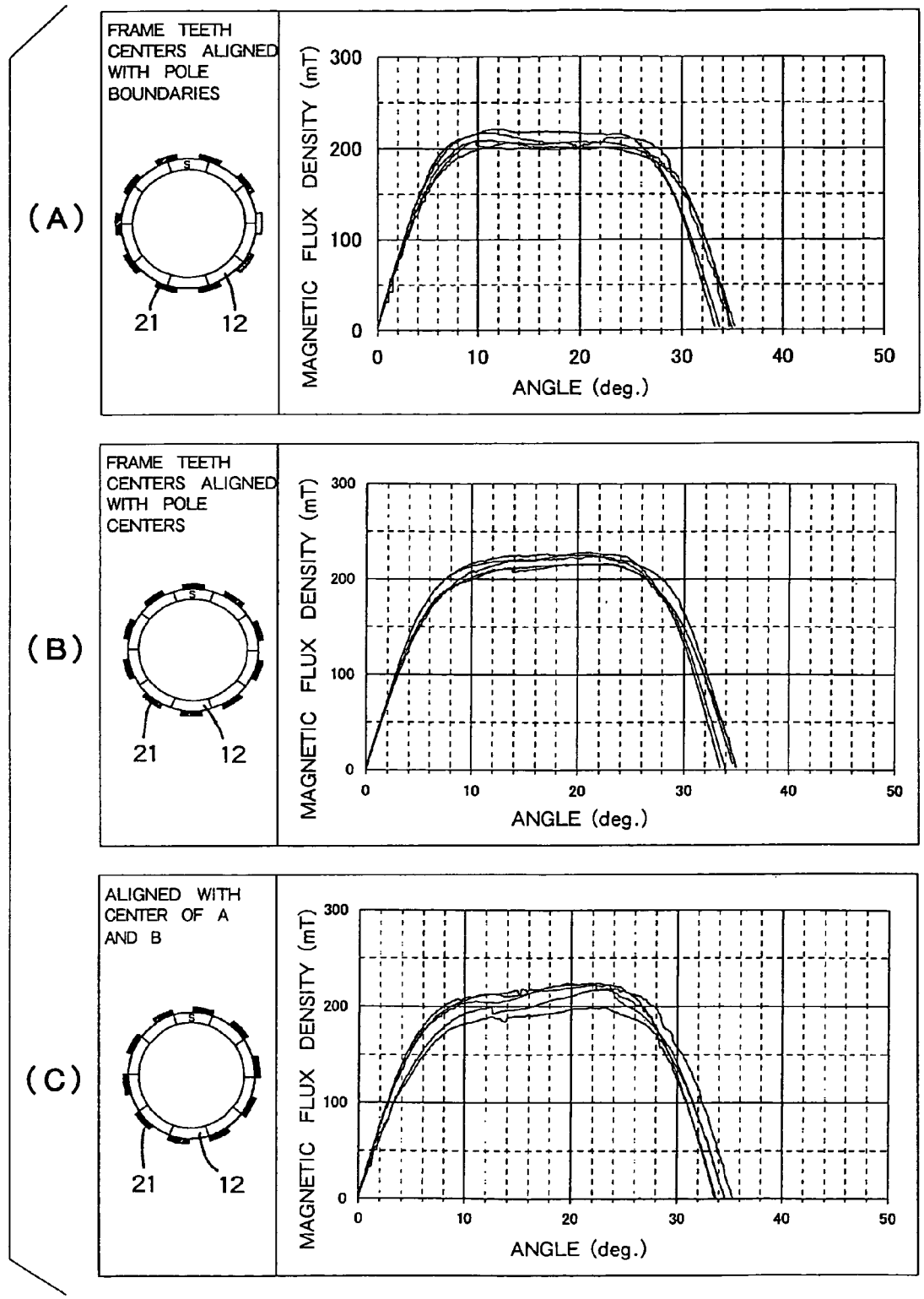
FIG. 8(A) is a magnetic flux density measurement graph of the magnetic poles when the comb teeth are disposed to face boundary positions between the magnetic poles.
FIG. 8(B) is a magnetic flux density measurement graph of the magnetic poles when central positions of the magnetic poles are aligned with central positions of the comb teeth.
FIG. 8(C) is a magnetic flux density measurement graph of the magnetic poles when the boundary positions between the magnetic poles are aligned with the boundary positions between the comb teeth.

Next, the positional relationships between the magnetic poles of the magnet 12 and the comb teeth of the comb-teeth-shaped back yoke 21 will be described. FIG. 8 shows graphs showing results of measurement of magnetic flux densities of the magnetic poles when the positional relationships between the magnetic poles and the comb teeth are changed in three ways. FIG. 8(A) shows an example in which the comb teeth are disposed to face boundary positions between the magnetic poles, FIG. 8(B) shows an example in which central positions of the magnetic poles are aligned with central positions of the comb teeth, and FIG. 8(C) shows an example in which the boundary positions between the magnetic poles are aligned with the boundary positions between (i.e., edges of) the comb teeth. In each of these figures, an abscissa represents a position of the magnetic pole in a width direction as a central angle of the magnet 12 and an ordinate represents magnetic flux density in each position.

FIG. 8 shows an example in which the magnet 12 is provided with ten magnetic poles, and has a diameter of 8.7 mm. In FIG. 8, magnetic flux density distribution curves of five south poles of the magnet 12 are overlaid.

Areas in the magnetic poles where the magnetic flux densities become the highest are the widest in FIG. 8(A) and the next widest is in FIG. 8(B). Therefore, it is clear that degrees of uniformity of the magnetic flux densities in the magnetic poles are the highest in the case where the central positions of the comb teeth face the boundary positions between the magnetic poles in the three cases of FIGS. 8(A) to 8(C). Therefore, in this embodiment, positioning between the comb-teeth-shaped back yoke 21 and the magnet 12 is carried out according to FIG. 8(A).

Incidentally, the magnetic flux densities of the magnetic poles change when positions of the magnetic poles of the magnet 12 and the comb teeth of the back yoke are changed in various ways because the back yoke is magnetized by lines of magnetic force from the magnet 12. Degrees to which lines of magnetic force produced by the respective comb teeth of the back yoke and the lines of magnetic force of the magnet 12 act on each other are different depending on the positional relationships between the magnetic poles and the comb teeth.

Figure 9:
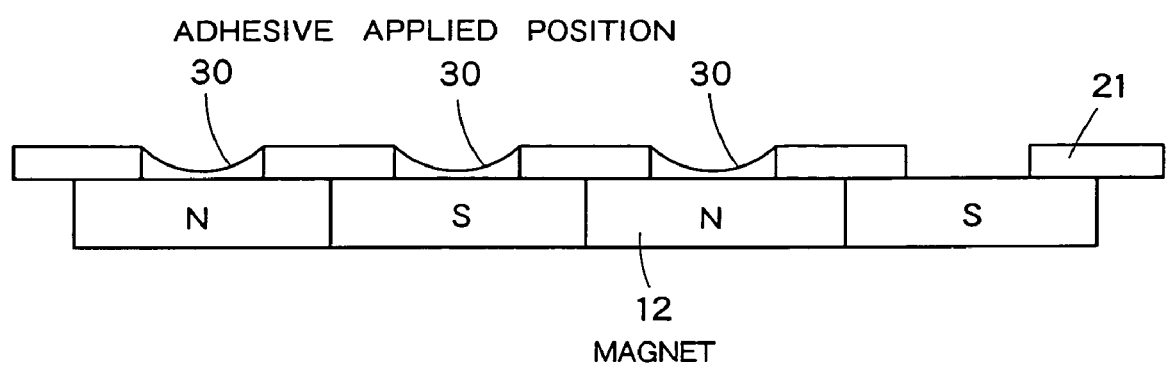
FIG. 9 is a drawing showing applied positions of adhesive 30.

As shown in FIG. 1, the weight member 22 is joined to the outer side face of the comb-teeth-shaped back yoke 21. The comb-teeth-shaped back yoke 21 and the weight member are joined to each other by using adhesive. FIG. 9 is a drawing showing applied positions of an adhesive 30.

As shown in FIG. 9, the adhesive 30 is applied between the comb teeth. More specifically, the magnet 12 and the frame 13 having the comb-teeth-shaped back yoke 21 are positioned with respect to each other and fixed by a jig and then the adhesive 30 is applied between the comb teeth. Because the adhesive 30 is exposed, it is possible to use an ultraviolet radiation type of adhesive that cures when exposed to ultraviolet radiation after application. Because recesses (adhesive reservoirs) are formed in the applied positions of the adhesive 30 as shown in FIG. 9, the adhesive is further applied to the recessed portions to join the weight member 22.

As described above, if the comb-teeth-shaped back yoke 21 is used, the adhesive 30 can be applied after carrying out positioning between the comb-teeth-shaped back yoke 21 and the frame 13 and therefore the positioning can be carried out accurately. Furthermore, it is possible to use the ultraviolet radiation type of adhesive 30. Moreover, the adhesive reservoirs for joining the weight member 22 are formed by application of the adhesive 30 and therefore it becomes easy to apply the adhesive for joining the weight member 22.

On the other hand, if a cup-shaped rotor frame having a side face of a uniform height is used instead of the comb teeth, an adhesive is applied to an inner side of the side face of the rotor frame and then the magnet has to be inserted along the applied face, which makes the application of the adhesive cumbersome. Moreover, the applied face of the adhesive is the inner side of the side face of the rotor frame and therefore the ultraviolet radiation type of adhesive cannot be used and only limited types of adhesive can be used. Furthermore, the adhesive reservoirs are not created after joining the rotor frame and the magnet to each other, which makes the application of the adhesive for joining the weight member cumbersome.

Although the example in which the comb-teeth-shaped back yoke 21 is provided as a part of the frame 13 has been described in the above-described embodiment, the comb-teeth-shaped back yoke 21 may be provided separately from the frame 13. In this case, a circular comb-teeth-shaped back yoke 21a formed by connecting and integrating a plurality of comb teeth may be stuck on an outer peripheral face of the magnet 12 and then the frame 13 may be mounted.

FIGS. 10A to 10C are drawings showing the example in which the annular comb-teeth-shaped back yoke 21a is provided separately from the frame 13. FIG. 10A shows a plan view and a side view of the magnet 12, FIG. 10B shows a plan view and a side view of a comb-teeth-shaped back yoke 21a to be stuck on the outer peripheral face of the magnet 12, and FIG. 10C shows a plan view and a side view of an assembled state of the magnet 12 and the comb-teeth-shaped back yoke 21a.

As shown in FIGS. 10A to 10C, the comb-teeth-shaped back yoke 21a is formed by connecting individual comb teeth into an annular shape. When the magnet 12 in FIG. 10A and the comb-teeth-shaped back yoke 21a in FIG. 10B are assembled, they are disposed so that central positions of the comb-teeth of the comb-teeth-shaped back yoke 21a coincide with the boundary positions between the magnetic poles of the magnet 12 as shown in FIG. 10C. As a result, similarly to FIG. 5, the magnetization waveform of the magnetic pole comes closer to the rectangular wave than to the sinusoidal wave.

As described above, according to the embodiment, the comb-teeth-shaped back yoke 21 is disposed to surround the magnet 12 (i.e., surround and oppose an outer circumferential surface of magnet 13 as shown in FIGS. 5, 8 and 10C), and the boundary positions between adjacent magnetic poles of the magnet 12 and the central positions of the comb teeth of the comb-teeth-shaped back yoke 21 face each other (as shown in FIGS. 8A and 10C). Therefore, the magnetic flux densities of the magnetic poles of the magnet 12 become uniform and it is possible to precisely carry out the stop position control when the motor is not energized.

Although the magnet 12 having ten magnetic poles and the comb-teeth-shaped back yoke 21 having ten comb teeth have been described in the above-described embodiment, the number of magnetic poles is not limited to that in the above-described embodiment. Moreover, sizes of the magnet 12 and the comb-teeth-shaped back yoke 21 are not limited to those in the above-described embodiment.

What is claimed is:

1. A stepping motor comprising:
   a stator; and
   a rotor surrounding the stator, the rotor having:
      an annular magnet having a plurality of magnetic poles formed along a circumference thereof; and
      a comb-teeth-shaped back yoke surrounding the magnet, the back yoke having a plurality of comb teeth facing boundary positions between adjacent magnetic poles;
   wherein the comb teeth are arranged to oppose and face an outer circumferential surface of the magnet, and so that a center position of each of the comb teeth opposes and faces a boundary position between a respective adjacent pair of the magnetic poles.

2. The stepping motor according to claim 1,
   wherein the number of the plurality of magnetic poles is equal to the number of the plurality of comb teeth.

3. The stepping motor according to claim 1, wherein widths of the plurality of comb teeth are half the widths of the magnetic poles of the magnet.

4. The stepping motor according to claim 1, further comprising:
   a weight member joined to at least a portion of an outside surface of the comb-teeth-shaped back yoke; and
   an adhesive applied between the adjacent comb teeth of the comb-teeth-shaped back yoke to join the weight member to the back yoke.

5. The stepping motor according to claim 4,
   wherein the adhesive is an ultraviolet radiation adhesive.

6. The stepping motor according to claim 1,
   wherein the rotor has a frame formed inseparably with the comb-teeth-shaped back yoke, a central portion of the frame having a shaft.

7. The stepping motor according to claim 1,
   wherein the rotor has a frame separate from the comb-teeth-shaped back yoke, a central portion of the frame having a shaft.

8. The stepping motor according to claim 7,
   wherein the comb-teeth-shaped back yoke has a circular member joining the plurality of comb teeth.

9. A rotor for a stepping motor comprising:
   an annular magnet having a plurality of magnetic poles formed along a circumference thereof; and
   a comb-teeth-shaped back yoke surrounding the magnet, the back yoke having a plurality of comb teeth facing boundary positions between adjacent magnetic poles;
   wherein the comb teeth are arranged to oppose and face an outer circumferential surface of the magnet, and so that a center position of each of the comb teeth opposes and faces a boundary position between a respective adjacent pair of the magnetic poles.

10. The rotor according to claim 9,
    wherein the number of the plurality of magnetic poles is equal to the number of the plurality of comb teeth.

11. The rotor according to claim 9, wherein
    widths of the plurality of comb teeth are half the widths of the magnetic poles of the magnet.

12. The rotor according to claim 9, further comprising:
    a weight member joined to at least a portion of an outside surface of the comb-teeth-shaped back yoke; and
    an adhesive applied between the adjacent comb teeth of the comb-teeth-shaped back yoke to join the weight member to the back yoke.

13. The rotor according to claim 12,
    wherein the adhesive is an ultraviolet radiation adhesive.

14. The rotor according to claim 9, further comprising:
    a frame formed inseparably with the comb-teeth-shaped back yoke, a central portion of the frame having a shaft.

15. The rotor according to claim 9, further comprising:
    a frame separate from the comb-teeth-shaped back yoke, a central portion of the frame having a shaft.

16. The rotor according to claim 15,
    wherein the comb-teeth-shaped back yoke has a circular member joining the plurality of comb teeth.

17. The stepping motor according to claim 1, wherein the comb teeth are located radially outward from the magnet such that a radially-inside surface of each of the comb teeth faces a radially-outside surface of the magnet.

18. The rotor according to claim 9, wherein the comb teeth are located radially outward from the magnet such that a radially-inside surface of each of the comb teeth faces a radially-outside surface of the magnet.

* * * * *